(12) United States Patent
Seki et al.

(10) Patent No.: US 11,297,771 B2
(45) Date of Patent: Apr. 12, 2022

(54) ADAPTIVE MULTI ROW HEADER FOR SUGAR CANE HARVESTER

(71) Applicant: CNH Industrial America LLC, New Holland, PA (US)

(72) Inventors: André Satoshi Seki, Sorocaba (BR); João Augusto Marcolin Lucca, São Pedro (BR)

(73) Assignee: CNH Industrial America LLC, New Holland, PA (US)

(*) Notice: Subject to any disclaimer, the term of this patent is extended or adjusted under 35 U.S.C. 154(b) by 738 days.

(21) Appl. No.: 15/987,264

(22) Filed: May 23, 2018

(65) Prior Publication Data

US 2018/0338426 A1  Nov. 29, 2018

(30) Foreign Application Priority Data

May 24, 2017  (BR) .......................... 1020170108511

(51) Int. Cl.
| | |
|---|---|
| *A01D 67/00* | (2006.01) |
| *A01D 63/02* | (2006.01) |
| *A01D 34/66* | (2006.01) |
| *A01D 45/10* | (2006.01) |

(52) U.S. Cl.
CPC ........... *A01D 67/00* (2013.01); *A01D 34/662* (2013.01); *A01D 34/664* (2013.01); *A01D 45/10* (2013.01); *A01D 63/02* (2013.01)

(58) Field of Classification Search
CPC .... A01D 67/00; A01D 34/662; A01D 34/664; A01D 45/10; A01D 63/02; A01D 41/12; A01D 45/003; A01D 47/00

USPC ........................................ 56/10.9, 13.9, 15.5
See application file for complete search history.

(56) References Cited

U.S. PATENT DOCUMENTS

| | | | | |
|---|---|---|---|---|
| 4,035,996 | A | * | 7/1977 | Fernandez ............. A01D 45/10 56/13.9 |
| 4,470,244 | A | * | 9/1984 | Leigers .................. A01D 63/02 56/13.9 |
| 5,063,728 | A | | 11/1991 | Garter et al. |
| 5,157,904 | A | * | 10/1992 | Otten ..................... A01D 45/10 56/14.3 |
| 8,028,506 | B1 | | 10/2011 | Casper et al. |
| 9,516,813 | B2 | * | 12/2016 | Richard ................. A01D 45/10 |
| 2010/0307121 | A1 | * | 12/2010 | Marchini ............... A01D 75/28 56/63 |

(Continued)

FOREIGN PATENT DOCUMENTS

| | | | | |
|---|---|---|---|---|
| CN | 201733619 U | * | 2/2011 | ............. A01D 45/10 |
| DE | 3213848 A1 | | 10/1983 | |

(Continued)

*Primary Examiner* — Arpad Fabian-Kovacs
(74) *Attorney, Agent, or Firm* — Peter Zacharias; Patrick Sheldrake

(57) ABSTRACT

An agricultural machine header which can be coupled to and uncoupled from a harvesting machine The header includes a frame having with a plurality of adjustable supports for coupling with at lest two row divider sets. The header further includes at least one pair of base cutting discs and at least one knock-down roller. The header supports the base cutting discs in an adjustable and flexible way that allows them to be adjusted according to conditions and characteristics of crop to be harvested.

21 Claims, 3 Drawing Sheets

(56) References Cited

U.S. PATENT DOCUMENTS

| | | | | |
|---|---|---|---|---|
| 2012/0110967 | A1* | 5/2012 | Hinds | A01D 45/10 56/53 |
| 2014/0165522 | A1* | 6/2014 | Braunbeck | A01D 45/10 56/10.6 |
| 2014/0352272 | A1 | 12/2014 | Parker et al. | |
| 2015/0327437 | A1* | 11/2015 | Mixon | A01D 45/10 56/16.4 C |
| 2015/0359177 | A1 | 12/2015 | Richard et al. | |
| 2015/0362904 | A1* | 12/2015 | Scrivner | A01D 41/127 700/275 |
| 2016/0135365 | A1 | 5/2016 | Cleodolphi et al. | |
| 2017/0280626 | A1* | 10/2017 | Bertino | A01D 75/28 |
| 2018/0338423 | A1* | 11/2018 | Lucca | A01D 41/127 |

FOREIGN PATENT DOCUMENTS

| | | | | |
|---|---|---|---|---|
| WO | 2007140520 | A1 | 12/2007 | |
| WO | WO-2009095763 | A2 * | 8/2009 | A01D 75/28 |
| WO | 2015066783 | A1 | 5/2015 | |

* cited by examiner

ADAPTIVE MULTI ROW HEADER FOR SUGAR CANE HARVESTER

FIELD OF THE INVENTION

The present invention relates to a header for agricultural machines, such as harvesters for tall stalk plants, for example, sugarcane and/or sweet sorghum. More specifically, the invention relates to a harvester header that can be coupled to and uncoupled from the harvesting machine and that comprises technical, constructive and functional characteristics designed and developed to support the basic cutting elements in an adjustable way.

The present invention further refers to a harvesting machine which is adapted to receive said header.

BACKGROUND OF THE INVENTION

According to the state of the art, and as it should be known to those skilled in the art, numerous models of agricultural machines and apparatuses are known to promote increased productivity in the harvesting of various types of plant crops, such as machines for harvesting grains in general, forage machines and machines for harvesting tall and stem plants, such as sugarcane harvesters.

It is known that grain harvesting machines, also known as grain harvesters or combined harvesters, have a configuration that allows harvesting different types of grains, and a header is attached to the front portion of the machine whose characteristics depend on the type of crop to be harvested, such as wheat, soybeans, corn, rice, etc.

In turn, forage machines are agricultural machines designed to harvest and grind a given plant crop to obtain forage, for example, hay.

Particularly in relation to tall stem plants, such as sugarcane, energy cane and sweet sorghum, harvesting machines are designed and developed to promote the harvesting of this specific type of crop, this is why their intrinsic characteristics require specific conditions for their safe and proper processing, from cutting to transfer to overboard baskets and carts.

Therefore, the sugarcane and/or sweet sorghum harvesting machine generally has a fixed opening for receiving and harvesting the planting rows, which are generally spaced at relatively fixed and predetermined distances of 0.9 m or of 1.5 m, or also machines designed to collect two simultaneous rows within these spacings. Optionally, the harvesting machine of this type of plant crop can also have a variable opening, which can optionally harvest one or two plantings rows spaced 0.9 m or 1.5 m apart, or planting rows with alternating spacing of 0.9 m and 1.5 m. A solution proposed for a sugarcane harvester having the possibility of adjusting the opening to harvest crops having different spacings between the planting rows is disclosed, for example, in WO2014/026255, which is incorporated herein by reference.

The cultivation of sugarcane and sweet sorghum goes through a great evolution, both in terms of the development of new varieties of plants, and in terms of different planting configurations, always with the aim of increasing productivity, both in relation to quantity of tons harvested per hectare and in relation to the quantity of alcohol and/or sugar produced per ton harvested. Furthermore, applications of these plant crops are also known for the generation of energy from their biomass, where, unlike the production of alcohol and sugar, not only the part of the plant stem is used, but also the foliage and, possibly, the inflorescence. Hence, sugarcane varieties destined to the generation of energy, commonly denominated energy cane, are also being developed to increase the amount of fibers and reduce the amount of concentrated sucrose in the plant.

One of the main problems observed in sugarcane and sweet sorghum plantations is that harvesting machines are restricted to in-line harvesting, that is, they can only harvest the crop if it is planted in established planting rows, such as rows of planting spaced 0.9 m or 1.5 m, or rows spaced alternately by 0.9 m and 1.5 m. In the case of plantations intended to obtain biomass, planting in rows is not necessary, that is, planting can be done randomly and, for this reason, conventional sugarcane and sorghum harvesting machines are not able to promote the harvest of this material.

One option, in the case of harvesting for biomass generation, would be the replacement of sugarcane and sweet sorghum harvesters by forage machines. However, forage machine do not prove efficient either for harvesting tall stem plants, such as sugarcane and sweet sorghum, since the header intended for forage harvesting, such as those provided by Kemper, from Münster, Germany, do not provide a good performance for harvesting this type of plants, because they exhibit great wear, they leave a great amount of biomass in the ground and they are not efficient in feeding the plants to the machine.

Another drawback observed in sugarcane and/or sweet sorghum harvesting machines is the fact that the front elements, such as row dividers, knock-down rollers, base cutting discs and lift rollers, are fastened to the chassis itself of the harvesting machine. As appreciated by those skilled in the art, these front elements are those that are most prone to wear, because they are precisely those that are in front line in contact with the soil and the plant culture, besides absorbing impacts. Thus, if any of these front elements are damaged during harvesting and need to be repaired or replaced, the harvesting machine needs to be picked up for proper maintenance and, as a result, the harvesting will be interrupted until the machine is either returned from maintenance or replaced by another machine.

Regardless of the situation, there is the great inconvenience of interrupting the entire harvesting machine for the maintenance of only one of the front elements, which can cause serious damage to the farmers, even with the eventual loss of the crop, if maintenance is prolonged too long.

In order to attempt to overcome some of the drawbacks above, documents US 2014/0174048, by CNH America LLC, which is also to be incorporated herein as a reference, discloses a biomass harvesting system consisting of a sugarcane harvester whose basic front elements have been removed to allow the installation of an independent header in front of a conveyor roller set. Said header being, for instance, a forage header for harvesting a plant crop, such as sugarcane and/or sweet sorghum, which was planted without a specific planting row pattern. In this sense, the machine disclosed in this document allows a greater variability for harvesting a planted plant crop with no regular planting rows or, in other words, allows harvesting independent of planting rows or lines.

Document BR 10 2015 015922 6, by CNH Industrial Latin America Ltda., discloses a sugarcane harvesting header and the like which can be coupled to the front portion of a harvesting machine, such as the above-mentioned harvester described in document US 2014/0174048, and thereby providing greater flexibility to harvest crops planted with different spacings, being able to change only the header, and not necessarily the whole machine. Moreover, if any of the front elements of the header is damaged during use, it is not necessary to stop the machine, but only change the header.

Furthermore, as appreciated by those skilled in the art, this flexibility in adapting the harvesting machine eliminates the need to stop the whole machine in case of damage to the front elements that are in the independent structure of said header and, therefore, it is enough for the farmer to replace this header while carrying out the necessary maintenance. As a result, the farmers no longer have to stop the harvest for long periods until the repair of a front element of the machine.

In spite of being highly functional and solving a series of problems disclosed by the sugarcane and/or sorghum harvesting machines known in the state of the art and mentioned above, in practice, it was observed that such equipment and machines for agricultural use could be improved and enhanced, especially with respect to the issue of flexibility and ability to adapt to different conditions and planting configurations practiced nowadays.

In this sense, as it must be known by those skilled in the art, in the case of sugarcane and sweet sorghum, planting is usually carried out in rows spaced 0.9 m, 1.5 m or rows spaced alternately by 0.9 m and 1.5 m. In this way, according to the equipment known in the state of the art, the configuration of the structures of these machines or headers is static, that is, the front elements are designed to harvest one planting row or two planting rows and, therefore, if the plantation presents a variation in its configuration, it is necessary to replace the entire header in order to be able to harvest under appropriate conditions.

Therefore, according to the state of the art, if one wished to harvest different planting row configurations, it is necessary to have at least two headers to be able to carry out this type of operation, a header to carry out a single-row harvest, and another header to carry out a double or alternating row harvest, for example.

Moreover, as in the case of machines whose front elements are fastened to the chassis of the harvester, in the case of headers whose elements are static, if any of them are damaged, it is necessary to replace the entire header to perform proper maintenance. Although practical and quick, as previously pointed out, there is the need of changing the whole header even though the damaged part is only one of the base cutting discs, or only one of the row divider rollers, for example.

This being the case, the agricultural equipment known in the state of the art, especially those headers which are coupled to and uncoupled from the harvesting machines, disclose some limitations and drawbacks that could be practically and effectively eliminated, improving flexibility, as intended by the present invention.

SUMMARY OF THE INVENTION

Therefore, based on the above, the first objective of the present invention is that of providing an agricultural machine header which can be coupled to and uncoupled from the harvesting machine and comprises a set of technical and constructive characteristics capable of eliminating the problems and limitations disclosed in the state of the art.

One of the objectives of the present invention is also that of providing a header for tall stalk plants, such as sugar can harvesters, which was designed and developed to allow the support of cutting elements and row dividers under an adjustable and flexible condition, and can thus be configured according to the conditions and characteristics of the plantation.

Therefore, in order to achieve the technical objectives and effects discussed above, among others, the present invention comprises a frame having a plurality of adjustable supports for proper coupling of at least two row divider sets, at least one pair of base cutting discs, and at least one knock-down roller, wherein said adjustable supports can be holes and openings located in said frame, which are distributed in a predetermined condition, where nuts and bolts are embedded and fastened for the support of the base front cutting elements.

According to the possible embodiments of the present invention, said adjustable supports may consist of a mechanical configuration, or electrical or hydraulic mechanisms, or also a combination thereof. By way of example of embodiment, said adjustable supports may comprise pinion-worms and/or hydraulic pistons which are driven for movement and position adjustment of the row divider sets, the base cutting discs and the knock-down roller.

In yet another possible embodiment of the present invention, said frame comprises a structure consisting of spaced crossbars, on which row divider sets, base cutting discs and knock-down roller are embedded and locked by way of said adjustable supports.

According to one embodiment, said frame of the header, object of the present invention, is responsible for supporting two base cutting disc sets, each one endowed with its own motor for the rotational movement of said discs. According to an alternative embodiment of the present invention, said header frame supports a base disc set which is configured in a structure within which there is a drive motor connected to said base cutting discs by combining synchronization belts and gears.

Moreover, according to another embodiment of the present invention, said base cutting disc sets consist of a fastening structure comprising juxtaposed plates, which are positioned on the respective crossbars of said frame.

Also, according to one more embodiment of the present invention, the row divider structure comprises a truss designed to be embedded in said crossbars of said structural frame of the present header for agricultural machines, wherein said truss Comprises locking means for safe stabilization of the structure next to the frame.

According to another possible embodiment of the present invention, said structural frame is a mobile portion of the rear part of the structure of said header where the lift rollers and the electric and hydraulic controls of the header are placed.

The present invention further relates to a harvesting machine of the type for harvesting tall stalk plants and substantially comprises a chassis mounted on conveyor belts or wheels, a drive motor, a cabin for operation and control, extractor systems and a billet conveyor (T), being especially designed and configured to receive a header comprising a frame whose structure allows for adjustable support of the row dividers, the base cutting disc sets and the knock-down roller, as defined by the present invention.

According to an embodiment of the present invention, said harvesting machine is preferably intended for cutting and harvesting sugarcane and/or sweet sorghum.

BRIEF DESCRIPTION OF THE DRAWINGS

The characteristics, advantages and technical effects of the present invention, as set forth above, will be better understood by one skilled in the art from the following detailed description, taken by way of example, and not limiting, of preferred embodiments, and with reference to the accompanying schematic drawings, wherein.

DESCRIPTION OF THE EMBODIMENTS OF THE INVENTION

Figure 1:
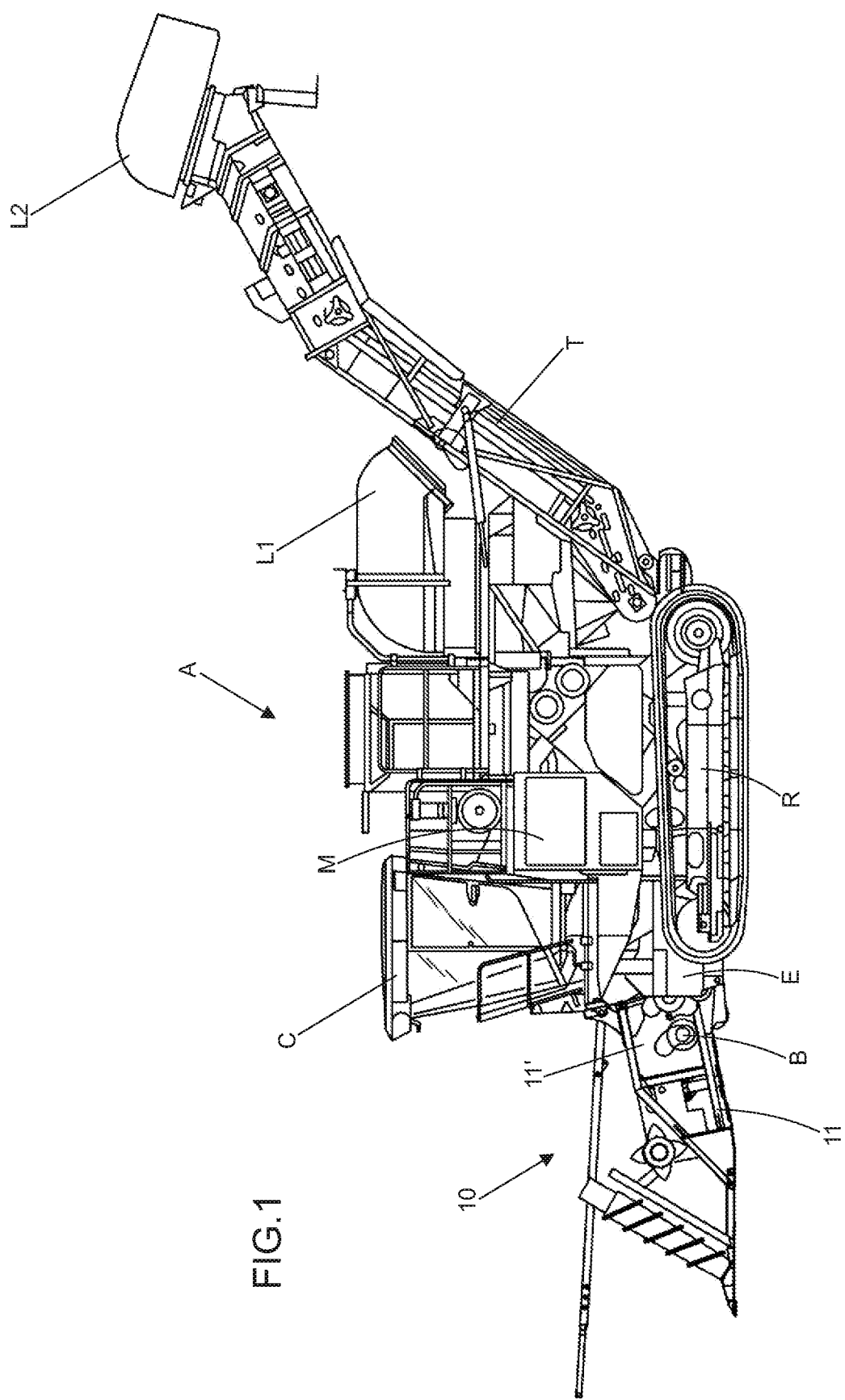
FIG. 1 shows an illustration of a sugarcane harvesting machine.

The particular embodiments of the invention are described herein with reference to the appended figures. These figures are schematic and their sizes and/or proportions may not correspond to reality, given that they aim at describing the invention in a didactic manner. Moreover, certain known and common constructive details may have been omitted for greater clarity and conciseness of the description which follows. The used reference numerals are repeated throughout the figures to identify identical or similar parts. Possibly used terms as "above", "below", "front", "rear", "right", "left", etc. and their variations must be construed according to the guidance provided in FIG. 1.

FIG. 1 shows agricultural machines of the sugarcane harvester type (A). Although the present specification relates to a sugar cane harvester, it is clear that the machine may also be employed for the harvesting of other tall stem plants such as sorghum. A harvesting machine (A) may be, for instance, a machine known in the state of the art, made available by CNH Industrial N.V. marketed under the trademark Case IH.

The harvesting machine (A) comprises a chassis (E) mounted on conveyor belts (R) or wheels, a drive motor (M), an operation and control cabin (C), a primary cleaning extractor system (L1), a billet elevator (T) with secondary cleaning extractor system (L2) transferring the billets to, for example, an overboard or prilling bucket (not shown). Furthermore, said harvesting machine (A) is designed to receive the header 10, object of the present invention, on which are installed, in an adjustable way, the plant cutting elements and also the row dividers, among others. As mentioned above, and by way of reference, this harvesting machine model, including its constructive details, can be observed from the teachings disclosed in US 2014/0174048, incorporated herein by reference.

Figure 2:
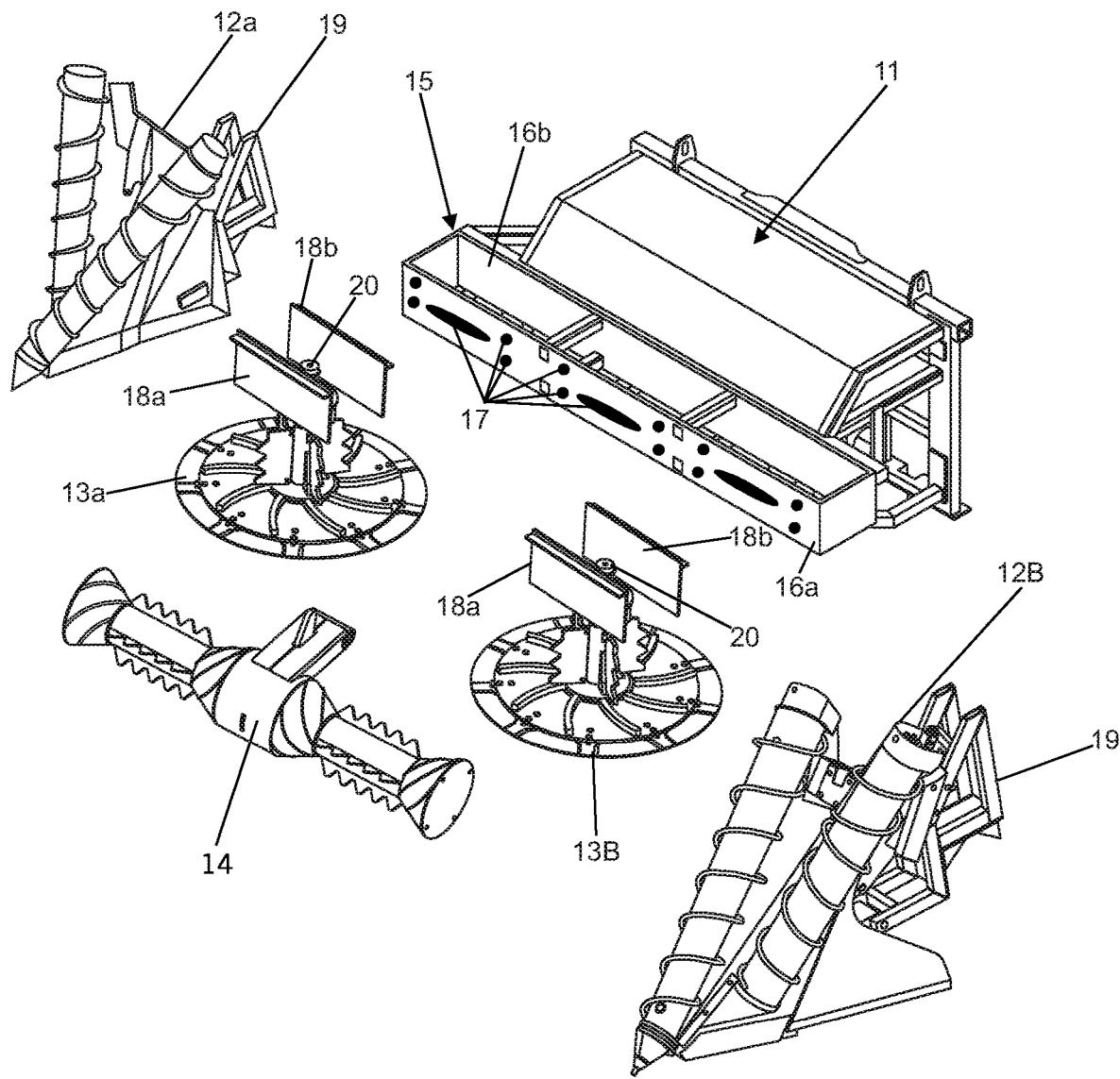
FIG. 2 shows an exploded perspective view of the header for harvesting machines according to an embodiment of the present invention.
Figure 3:
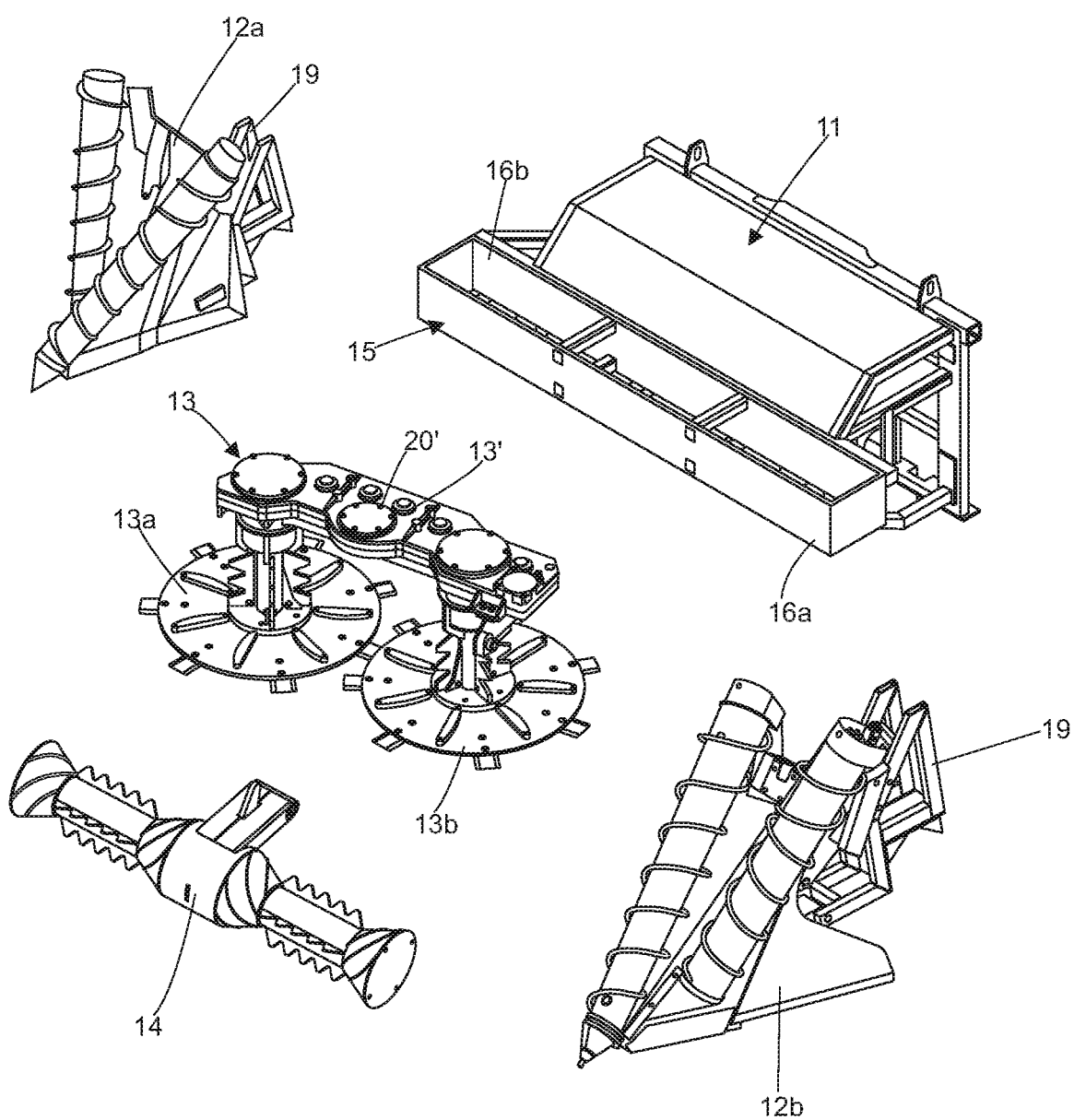
FIG. 3 shows an exploded perspective view of an alternative embodiment of the header for agricultural machines according to the present invention.

With reference to FIGS. 2 and 3, the header 10 of the invention comprises a frame 11 provided with supports for the coupling of at least two row divider sets 12a, 12b, at least one pair of base cutting discs 13a, 13b, and at least one knock-down roller 14.

Said supports may be purely mechanical components, such as a combination of holes and openings 17 in the frame 11 that allows the locking of the cutting elements, as well as the row dividers, through a nut and a screw. These supports may be optionally other mechanical elements or even electrical mechanisms, such as electric motors capable of promoting longitudinal displacement of the cutting elements and/or the row dividers. Said supports may alternatively be hydraulic ones, also in order to use the hydraulic system commonly used in agricultural machines. Logically, as appreciated by those skilled in the art, it is also possible to use a combination of such mechanical, electrical and hydraulic means for the adjustable support of these elements.

According to more modern and automated embodiments, such adjustable supports may comprise pinion-worms and/or hydraulic pistons which may be driven by motors and electrical signals, enabling said elements, such as cutting discs and row dividers, to be displaced and repositioned on the header frame 11 as required.

According to a possible embodiment of the present invention, said frame 11 comprises a frame 15 formed by two spaced crossbars 16a, 16b, in which said cutting elements are embedded and locked.

In the case where the supports use nuts and bolt fastening, said crossbars 16a, 16b comprise a number of holes 17 arranged in a predetermined way for the correct positioning and stable fastening of the cutting elements according to the type of harvest that the farmers are carrying out.

The row divider structures 12a, 12b of the base cutting discs 13a, 13b, as well as of said knock-down roller 14 may optionally have a constructive configuration which allows stable and safe anchorage next to the frame 11, thus, eliminating the need for bolts and nuts.

According to an embodiment of the present invention, and as shown in FIG. 2, said frame 11 can support two base cutting disc sets 13a, 13b, each containing a motor (20) suitable for rotational movement of said discs. Alternatively, and shown in FIG. 3, the base disc set 13 may be configured in a structure 13' which comprises only one drive motor (20') for both the base cutting discs 13a, 13b, wherein in this configuration there is a combination of belts and/or gears responsible for synchronizing the rotational movements of said base cutting discs 13a, 13b.

According to a possible embodiment of the present invention, said base cutting disc sets 13a, 13b comprise a fastening structure formed by juxtaposed plates 18a, 18b, which are designed to be embedded in and fastened to the respective crossbars 16a, 16b of said frame 11.

The structure of the row dividers 12a, 12b, further comprises a truss 19 configured to be preferably embedded in said crossbars 16a, 16b of said frame 11. They optionally comprise locking means whose purpose is to stabilize said structures of the row dividers 12a, 12b next to said crossbars 16a, 16b of said frame 11.

Additionally, according to a preferred embodiment of the present invention said frame 11 is a movable portion that can be coupled to and uncoupled from the rear portion 11' of the header 10 where the lift rollers (B) are arranged to drive the cut material into the harvesting machine (A).

Also, as discussed above, the present invention relates to a harvesting machine, such as the machine (A) for harvesting tall stalk plants, which is adapted and configured so as to enable coupling of the header, object of the present which invention, comprises said frame 11 whose construction allows adjustable support of the cutting elements, such as row dividers 12, base cutting disc sets 13 and knock-down roller 14.

Said harvesting machine (A) is preferably intended for harvesting sugarcane and/or sweet sorghum Therefore, on the basis of the above mentioned, it is important to note that the header 10 properly installed in the harvesting machines (A) according to the present invention can be an agricultural equipment of high productivity, since the farmer himself can configure, in a simple way, its header according to the desired type of harvest. Moreover, as appreciated by those skilled in the art, by way of the header 10, object of the present invention, the farmer can carry out the punctual maintenance of the damaged elements, without the need to interrupt the harvest for a long period, since he can now perform the maintenance/replacement of that damaged front element.

Finally, considering the above, it is worth reiterating that the present description is only intended to disclose and define, in an exemplary manner, possible and preferred embodiments of the header for agricultural machines according to the present invention. Therefore, as will be clear to those skilled in the art, numerous modifications and adaptations of elements and equivalent technical/construction details are possible without thereby departing from the scope of protection delimited by the appended claims.

What is claimed is:

1. A header for an agricultural machine, the header comprising:
at least two row divider sets;
a frame extending in a vertical direction between a top side of the frame and a bottom side of the frame and in a horizontal direction between a forward side of the frame and a rear side of the frame, the frame comprising:
a plurality of adjustable supports for coupling with the at least two row divider sets; and
a pair of spaced, vertical crossbars, the crossbars being planar and parallel to one another and being further spaced apart from one another in the horizontal direction;
at least one pair of base cutting discs; and
at least one knock-down roller,
wherein the at least two row divider sets, the at least one pair of base cutting discs, and the at least one knock-down roller are embedded on and locked with the adjustable supports.

2. The header according to claim 1, wherein the adjustable supports are holes and openings located in the frame distributed in predetermined positions.

3. The header according to claim 1, further comprising at least one pair of motors, wherein the frame supports the at least one pair of base cutting discs, and wherein the at least one pair of motors drive respective ones of the at least one pair of base cutting discs.

4. The header according to claim 1, further comprising one drive motor and a structure housing the one drive motor, wherein the one drive motor is connected to the at least one pair of base cutting discs for synchronized rotational movement.

5. The header according to claim 1, further comprising a fastening structure comprising juxtaposed plates placed on respective ones of the two spaced crossbars, the fastening structure for fastening the at least one pair of base cutting discs to the crossbars.

6. The header according to claim 1, wherein each of the at least two row divider sets comprises a truss designed to be embedded in the crossbars of the frame.

7. The header according to claim 6, wherein the truss of each of the at least two row divider sets comprises a lock.

8. The header according to claim 1, wherein the frame is a mobile portion of a rear part of the header.

9. The header according to claim 1, wherein the pair of spaced, vertical crossbars comprises a first crossbar and a second crossbar, the first crossbar extending along the forward side of the frame and the second crossbar extending along the rear side of the frame.

10. The header according to claim 9, wherein the first and second crossbars are aligned in the horizontal direction such that the first crossbar is disposed at a same vertical position as the second crossbar in the vertical direction.

11. The header according to claim 9, wherein the adjustable supports comprise holes or openings defined in the first crossbar along the forward side of the frame.

12. The header according to claim 9, further comprising a fastening structure for fastening the at least one pair of base cutting discs to the crossbars, the fastening structure comprises a pair of juxtaposed plates, with a first plate of the pair of juxtaposed plates configured to be coupled to the first crossbar and a second plate of the pair of juxtaposed plates configured to be coupled to the second crossbar.

13. A harvesting machine for harvesting tall stem plants, the machine comprising:
a chassis transported by belts or wheels;
a drive motor;
a cabin for operation and control;
primary and secondary cleaning extractor systems;
a billet elevator; and
a header comprising:
at least two row divider sets;
a frame extending in a vertical direction between a top side of the frame and a bottom side of the frame and in a horizontal direction between a forward side of the frame and a rear side of the frame, the frame comprising:
a plurality of adjustable supports for coupling with the at least two row divider sets; and
a pair of spaced, vertical crossbars, the crossbars being planar and parallel to one another and being further spaced apart from one another in the horizontal direction;
at least one pair of base cutting discs; and
at least one knock-down roller,
wherein the at least two row divider sets, the at least one pair of base cutting discs, and the at least one knock-down roller are embedded on and locked with the adjustable supports.

14. The machine according to claim 13, wherein the adjustable supports are holes and openings located in the frame distributed in predetermined positions.

15. The machine according to claim 13, further comprising at least one pair of motors, wherein the frame supports the at least one pair of base cutting discs, and wherein the at least one pair of motors drive respective ones of the at least one pair of base cutting discs.

16. The machine according to claim 13, further comprising one drive motor and a structure housing the one drive motor, wherein the one drive motor is connected to the at least one pair of base cutting discs for synchronized rotational movement.

17. The machine according to claim 13, further comprising a fastening structure comprising juxtaposed plates placed on respective ones of the two spaced crossbars, the fastening structure for fastening the at least one pair of base cutting discs to the crossbars.

18. The machine according to claim 13, wherein each of the at least two row divider sets comprises a truss designed to be embedded in the crossbars of the frame.

19. The machine according to claim 13, wherein the pair of spaced, vertical crossbars comprises a first crossbar and a second crossbar, the first crossbar extending along the forward side of the frame and the second crossbar extending along the rear side of the frame.

20. The machine according to claim 19, wherein the first and second crossbars are aligned in the horizontal direction such that the first crossbar is disposed at a same vertical position as the second crossbar in the vertical direction.

21. The machine according to claim 19, further comprising a fastening structure for fastening the at least one pair of base cutting discs to the crossbars, the fastening structure comprises a pair of juxtaposed plates, with a first plate of the pair of juxtaposed plates configured to be coupled to the first crossbar and a second plate of the pair of juxtaposed plates configured to be coupled to the second crossbar.

\* \* \* \* \*